United States Patent
Hsu (10) Patent No.: US 8,978,103 B2
(45) Date of Patent: Mar. 10, 2015

(54) METHOD AND APPARATUS FOR INTERWORKING AUTHORIZATION OF DUAL STACK OPERATION

(75) Inventor: Raymond Tah-Sheng Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1543 days.

(21) Appl. No.: 11/840,735

(22) Filed: Aug. 17, 2007

(65) Prior Publication Data

US 2008/0104678 A1 May 1, 2008

Related U.S. Application Data

(60) Provisional application No. 60/839,357, filed on Aug. 21, 2006.

(51) Int. Cl.
*G06F 7/04* (2006.01)
*H04L 29/06* (2006.01)
*H04W 12/00* (2009.01)
*H04W 80/04* (2009.01)

(52) U.S. Cl.
CPC ............. *H04L 63/08* (2013.01); *H04L 63/10* (2013.01); *H04L 63/06* (2013.01); *H04W 12/00* (2013.01); *H04W 80/045* (2013.01)
USPC .......................................................... 726/4

(58) Field of Classification Search
CPC ......... H04L 63/08; H04L 63/10; H04L 63/06; H04W 12/00; H04W 80/045
USPC ........................................ 726/4, 15; 713/171
See application file for complete search history.

(56) References Cited

U.S. PATENT DOCUMENTS

| 6,122,246 | A  | 9/2000  | Marchok et al. |
| 6,256,509 | B1 | 7/2001  | Tanaka et al. |
| 7,023,928 | B2 | 4/2006  | Laroia et al. |
| 7,242,722 | B2 | 7/2007  | Krauss et al. |
| 7,283,498 | B2 | 10/2007 | Ro et al. |
| 7,619,963 | B2 | 11/2009 | Abe et al. |

(Continued)

FOREIGN PATENT DOCUMENTS

| EP | 1542488 A1 | 6/2005 |
| EP | 1677480 A1 | 7/2006 |

(Continued)

OTHER PUBLICATIONS

International Preliminary Report on Patentability, PCT/US2007/076432—The International Bureau of WIPO—Geneva, Switzerland, Feb. 24, 2009.

(Continued)

*Primary Examiner* — Mohammad W Reza
(74) *Attorney, Agent, or Firm* — Won Tae Kim

(57) ABSTRACT

A method of allowing interworking authorization of dual stack operation is provided. The method allows for simultaneous operation in both IPv4 and IPv6 if a terminal is authorized and authenticated to use both versions. The method utilizes the following steps: requesting authentication from an authorization entity in a wireless communication system; and receiving an authentication message from the authorization entity if the authentication is successful, wherein the authentication message contains an authorization to use at least one internet protocol version to establish at least one secure tunnel for communication.

18 Claims, 8 Drawing Sheets

Tunnel Establishment Flow

IP Sec. Tunnel Establishment Flow

(56) References Cited

U.S. PATENT DOCUMENTS

| | | | |
|---|---|---|---|
| 7,634,014 B2 | 12/2009 | Park et al. | |
| 7,660,275 B2 | 2/2010 | Vijayan et al. | |
| 7,729,305 B2 | 6/2010 | Cho et al. | |
| 7,733,917 B2 | 6/2010 | Han et al. | |
| 7,783,293 B2 | 8/2010 | Tujkovic et al. | |
| 8,174,995 B2 | 5/2012 | Malladi | |
| 2004/0111520 A1* | 6/2004 | Krantz et al. | 709/229 |
| 2004/0141488 A1* | 7/2004 | Kim et al. | 370/338 |
| 2004/0184425 A1* | 9/2004 | Lai et al. | 370/338 |
| 2006/0015590 A1* | 1/2006 | Patil et al. | 709/220 |
| 2006/0067284 A1* | 3/2006 | Borella | 370/338 |
| 2006/0098569 A1 | 5/2006 | Han et al. | |
| 2006/0185012 A1* | 8/2006 | Olivereau et al. | 726/14 |
| 2006/0209670 A1 | 9/2006 | Gorokhov et al. | |
| 2006/0209732 A1 | 9/2006 | Gorokhov et al. | |
| 2006/0280113 A1 | 12/2006 | Huo | |
| 2007/0008924 A1* | 1/2007 | Moran | 370/331 |
| 2007/0070945 A1 | 3/2007 | Wang et al. | |
| 2007/0104174 A1 | 5/2007 | Nystrom et al. | |
| 2007/0189219 A1* | 8/2007 | Navali et al. | 370/331 |
| 2007/0248037 A1 | 10/2007 | Stewart et al. | |
| 2007/0248045 A1 | 10/2007 | Nagaraj | |
| 2008/0141360 A1* | 6/2008 | Hicks et al. | 726/15 |
| 2009/0296630 A1* | 12/2009 | Chen et al. | 370/328 |
| 2010/0284488 A1 | 11/2010 | Murakami et al. | |
| 2011/0064039 A1 | 3/2011 | Sutivong et al. | |

FOREIGN PATENT DOCUMENTS

| | | |
|---|---|---|
| GB | 2415872 | 1/2006 |
| JP | 11331070 A | 11/1999 |
| JP | 2004056489 A | 2/2004 |
| RU | 2251812 C2 | 5/2005 |
| RU | 2006110038 | 8/2006 |
| TW | 254546 B | 5/2006 |
| WO | WO2005022792 A2 | 3/2005 |
| WO | WO-2005043829 A2 | 5/2005 |
| WO | WO2005122517 | 12/2005 |
| WO | WO2006059216 A1 | 6/2006 |

OTHER PUBLICATIONS

"Project No. 3-0174-200, proposed creation of a new TIA Standard, cdma2000 (R) Wireless Local Area Network interworking. (if approved, to be published as TIA-1050-200); SP-3-0174-200" EIA/TIA Drafts Telecommunications Industry Association, Arlington, VA, US, May 19, 2006, XP017005491, pp. 9-14.

Graveman R. et al.: "Using IPsec to Secure IPv6-in-IPv4 Tunnels; draft-ietf-v6ops-l psec-tu nnels-02.txt" IETF Standard-Working-Draft, Internet Engineering Task Force, IETF, Mar. 6, 2006, XP015044216.

Kaufman C. et al.: "Internet Key Exchange (IKEv2) Protocol; RFC 4306" IETF Standard, Internet Engineering Task Force. IETF, Dec. 2005, XPO15043225.

International Search Report—PCT/US07/076432, International Search Authority—European Patent Office—Apr. 11, 2008.

Written Opinion—PCT/US07/076432, International Search Authority—European Patent Office—Apr. 11, 2008.

3rd Generation Partnership Project 2: "Access to Operator Service and Mobility for WLAN Interworking" 3GPP2 X.S0028-200 V.0.3, May 8, 2006, XP007905112.

"Access to Operator Service and Mobility for WLAN Interworking",3rd Generation Partnership Project 2 "3GPP2", [online], Apr. 26, 2006, 3GPP2 X.P0028-200, Version 0.2, [retrieved on Sep. 7, 2011]. Retrieved from the Internet,URL,<http://ftp.3gpp2.org/TSGX/Working/2006/2006-04/TR45.6-2006-04-KansasCity/2006042608%20TIA-1050%20WLAN%20%283%20parts%29/X31-20060327-xxx%20X.P0028-200%20v0.2%20for%202nd%20R&F%20%28Clean%29.pdf>.

Ala-Laurila, J., et al., "Wireless LAN Access Network Architecture for Mobile Operators", IEEE Communications Magazine, vol. 39, issue 11, 2001, pp. 82-89.

J. Wiljakka, ed., "Analysis on IPv6 Transition in Third Generation Partnership Project (3GPP) Networks", Network Working Group Request for Comments: 4215, [online], Oct. 2005, Category: Informational,[retrieved on Sep. 6, 2011]. Retrieved from the Internet,URL, <http://tools.ietf.org/html/rfc4215>.

Makoto Otani et al., "Development of a Network User Authentication System for IPv/IPv6 Dual Stack Network," Journal of the Information Processing Society of Japan, Apr. 15, 2006, vol. 47, No. 4, pp. 1146-1156.

Montenegro, G., Editor, "Reverse Tunneling for Mobile IP", IETF, Network Working Group, RFC 2344, May 1998.

Taiwanese Search report—096130993—TIPO—Dec. 6, 2010.

Tatsuya Baba, "Learn before Creation of VPN Environment, VPN that We Want to Know, 3rd. Use of IP sec in Remote Access VPN," Network World, IDG Japan, May 1, 2004, vol. 9, No. 5, pp. 132-138.

Baba, T., "Let's learn VPN before constructing VPN environment; No. 3, Use of IPsec for Remote Access VPN", Network World, Japan, IDG Japan Inc., May 1, 2004, vol. 9, No. 5, p. 132-138.

* cited by examiner

FIG. 1

INITIATOR                                    RESPONDER
HDR, SK {SA, Ni, [Kei], [Tsi, TSr]} ⟶

FIG. 2 – CREATE_CHILD_SA REQUEST CONTENTS

INITIATOR                                    RESPONDER
                ⟵ HDR, SK {SA, Nr, [Ker], [Tsi, TSr]}

FIG. 3 – CREATE_CHILD_SA RESPONSE CONTENTS

FIG. 4A — Tunnel Establishment Flow

FIG. 4B – IP Sec. Tunnel Establishment Flow

The IP-Version-Authorized VSA indicates whether the MS is authorized for using IPv4 and/or IPv6.

```
 0                   1                   2                   3
 0 1 2 3 4 5 6 7 8 9 0 1 2 3 4 5 6 7 8 9 0 1 2 3 4 5 6 7 8 9 0 1
+---------------+---------------+-------------------------------+
|     Type      |    Length     |          Vendor-ID            |
+---------------+---------------+---------------+---------------+
|       Vendor-ID (cont.)       |  Vendor-Type  | Vendor-Length |
+-------------------------------+---------------+---------------+
|                         Vendor-Value                          |
+---------------------------------------------------------------+
```

Type: 26
Length: 12
Vendor ID: 5535

Vendor-Type: TBD
Vendor-Length: 6
Vendor-Value:
  0: MS is authorized for both IPv4 and IPv6
  1: MS is authorized only for IPv4
  2: MS is authorized only for IPv6
  All other values reserved for future use.

FIG. 5 IP-Version-Authorized RADIUS VSA

AUTHORIZED IPv4 - IPv6 DUAL STACK OPERATION
FIG. 6

OPERATION - IPv4 AUTHORIZED, IPv6 NOT AUTHORIZED

FIG. 7

OPERATION - IPv4 NOT AUTHORIZED, IPv6 AUTHORIZED

FIG. 8

METHOD AND APPARATUS FOR INTERWORKING AUTHORIZATION OF DUAL STACK OPERATION

CROSS-REFERENCE TO RELATED APPLICATION

This application claims the benefit of U.S. Provisional Patent application Ser. No. 60/839,357 entitled "METHOD AND APPARATUS FOR FLEXIBLE PILOT PATTERN" which was filed Aug. 21, 2006. The entirety of the aforementioned application is herein incorporated by reference.

FIELD OF THE INVENTION

The present invention relates generally to communication systems, and more specifically, to a method and apparatus for interworking authorization of dual stack operation.

BACKGROUND

Wireless communication technologies have seen tremendous growth in the last few years. This growth has been fueled in part by the freedom of movement offered by wireless technologies and the greatly improved quality of voice and data communications over the wireless medium. Improved quality of voice services along with the addition of data services have had and will continue to have a significant effect on the communicating public. The additional services include accessing the Internet using a mobile device while roaming.

The ability to maintain a data session while moving is important to both users and system operators. As more users utilize mobile internet protocol operations a user may want to have simultaneous access to the same packet data interworking function using dual stack operation, which allows simultaneous use of two version of a mobile internet protocol. The packet data interworking function (PDIF) acts as a security gateway protecting the cellular network.

Figure 1:
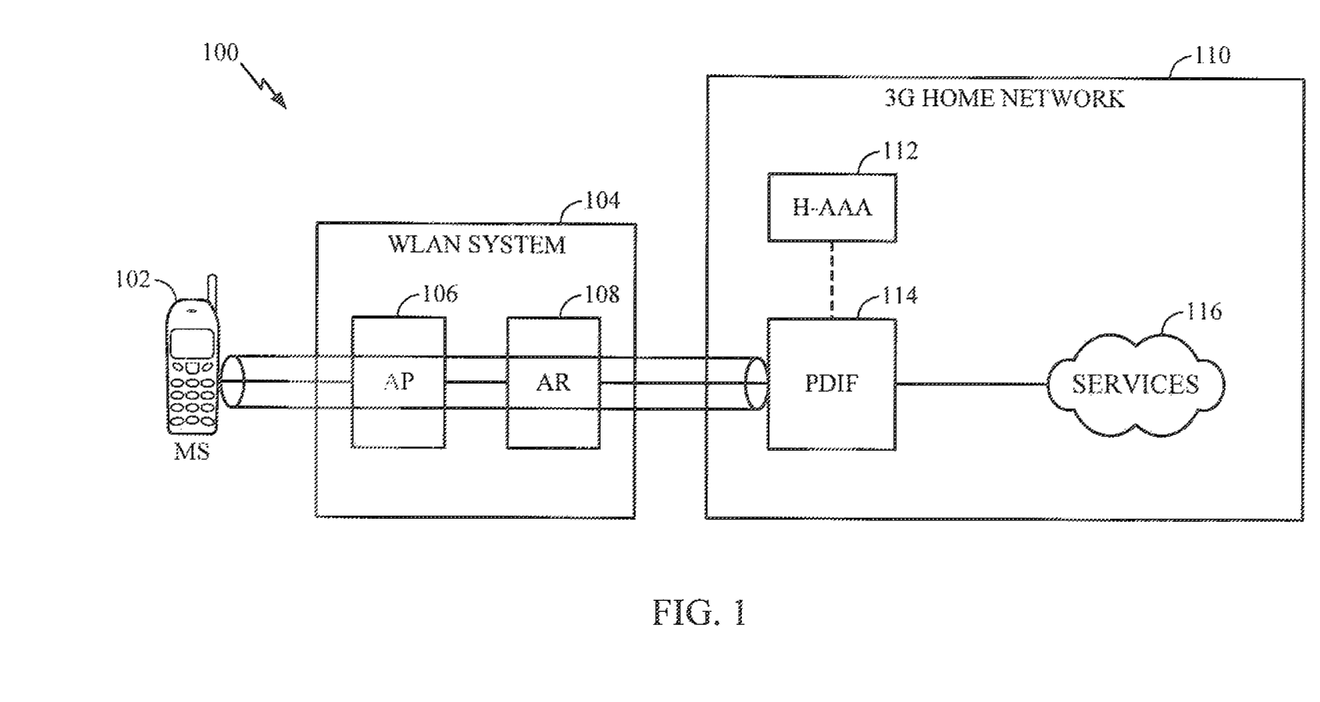
FIG. 1 is a block diagram that shows an interworking architecture for supporting interworking authorization of dual stack operation according to an embodiment of the invention.

FIG. 1 shows an interworking architecture for a wireless local area network (WLAN). The network may be part of a wireless communication system operating on the 3GPP2 standard defined by the standard offered by a consortium named "3rd Generation Partnership Project 2" referred to herein as 3GPP2. The architecture, 100, includes a mobile station (MS), 102, connected to a WLAN system, 104. The WLAN system, 104 includes the Access Point (AP) 106, and Access Router (AR) 108. The WLAN system is connected to the 3G Home Network 110. The WLAN system connects to the 3G Home Network 110 via the Packet Data Interworking Function (PDIF) 122. The PDIF 114 is connected to the Home Authentication, Authorization, and Accounting (H-AAA) device 112.

The MS establishes a secure IP tunnel with the PDIF, which acts as a security gateway in the 3G Home Network. The tunnel establishment is authenticated and authorized by the H-AAA 112. After the tunnel has been established, the MS may access services in the 3G Home Network 110. The dashed line in FIG. 1 indicates the path for Authentication, Authorization, and Accounting information and indicates information transfer between H-AAA 112 and PDIF 114. The solid lines show the bearer path for user data traffic and the pipeline indicates the secure tunnel protecting the user data traffic between the MS 102 and the PDIF 114.

The MS is pre-configured with the PDIF address information, either an IP address or a Fully Qualified Domain Name (FQDN). If the MS is configured with the PDIF's FQDN, the MS will relay on the Domain Name System (DNS) to resolve the IP address associated with the FQDN. The MS uses Internet Key Exchange version 2 (IKEv2) to establish secure tunnels, known as IP-sec tunnels for data transfer, with the PIDF. Part of establishing a secure tunnel requires that the MS be authenticated and authorized by the H-AAA, 112 in FIG. 1. The MS may use a number of procedures for mutual authentication. The authentication information, including credentials and random challenges, are transported in Extensible Authentication Protocol (EAP) messages exchanged between the MS and H-AAA. The EAP messages are transported in the IKEv2 messages between the MS and the PDIF, and also in the RADIUS messages exchanged between the PDIF and H-AAA.

The MS may desire simultaneous access to the same PDIF using both IPv4 and IPv6. This dual stack operation poses authorization problems for the PDIF, namely, the PDIF needs to know whether a MS is authorized for IPv4 and/or IPv6. Additionally, the PDIF needs to indicate to the MS that the MS is not authorized for one of the IP versions, in the case of an MS requesting dual stack operation that is not authorized for both IPv4 and IPv6. There is a need for a method and apparatus to indicate IP authorization to a MS and also to indicate to a MS that the MS is not authorized for both IP versions.

SUMMARY

A method for dual stack authorization and operation in a communication system incorporating requesting authentication from an authorization entity in the communication system and then receiving an authentication message from the authorization entity if the authentication is successful, wherein the authentication message contains an authorization to use at least one internet protocol version to establish at least one secure tunnel for communication.

A further embodiment provides for a method comprising: requesting dual stack operation using more than one internet protocol version; receiving authorization for dual stack operation using more than one internet protocol version; establishing a separate subordinate security authorization for each internet protocol version, wherein the subordinate security authorization is subordinate to the internet key exchange security authorization; establishing at least one secure tunnel for communication; and accessing simultaneously both internet protocol versions using the at lest one secure tunnel for communication.

Yet another embodiment provides a method comprising; requesting dual stack operation using more than one internet protocol version; receiving authorization for one internet protocol version in a message, wherein the message identifies at least one internet protocol version that is authorized and further wherein the message identifies at least one internet protocol version that is not authorized; establishing a security authorization for the authorized internet protocol version, wherein the security authorization for the authorized internet protocol version is subordinate to a internet key exchange security authorization; establishing a secure tunnel for communication; and communicating using the secure tunnel.

Another embodiment provides for an apparatus composed of the following elements: a transmitter for requesting authentication from an authorization entity in a wireless communication system; and a receiver for receiving an authentication message from the authentication entity if the authentication is successful, wherein the authentication message contains an authorization to use at least one internet protocol version to establish at least one secure tunnel for communication.

An additional embodiment provides for an apparatus composed of the following elements: a transmitter for requesting dual stack operation using more than one internet protocol version; a receiver for receiving authorization for dual stack operation using more than one internet protocol version; a memory for storing a separate subordinate security authorization for each internet protocol version, wherein the subordinate security authorization is subordinate to the internet key exchange security authorization; a processor for establishing at least one secure tunnel for communication using the transmitter; and a transmitter for accessing simultaneously more than one internet protocol versions using the at least one secure tunnel for communication.

Yet another embodiment provides for an apparatus that includes the following elements: a transmitter for requesting dual stack operation using more than one internet protocol version; a receiver for receiving authorization for one internet protocol version in a message, wherein the message identifies at least one internet protocol version that is authorized and further wherein the message identifies at least one internet protocol version that is not authorized; a processor for establishing a security authorization for the authorized internet protocol version, wherein the security authorization for the authorized internet protocol version is subordinate to a internet key exchange security authorization; a memory for storing the security authorization for the authorized internet protocol version; a transmitter for establishing a secure tunnel for communication; and a transmitter for communicating using the secure tunnel.

Another embodiment provides an apparatus composed of the following elements: means for requesting authentication from an authorization entity in a wireless communication system; and means for receiving an authentication message from the authorization entity if the authentication is successful, wherein the authentication message contains an authorization to use at least one internet protocol version to establish at least one secure tunnel for communication.

An additional embodiment provides a method composed of the steps: means requesting dual stack operation using more than one internet protocol version; means for receiving authorization for dual stack operation using more than one internet protocol version; means for establishing a separate subordinate security authorization for each internet protocol version, wherein the subordinate security authorization is subordinate to the internet key exchange security authorization; means for establishing at least one secure tunnel for communication; and means for accessing simultaneously both internet protocol versions using the at lest one secure tunnel for communication.

A further embodiment provides an apparatus comprising; means for requesting dual stack operation using more than one internet protocol version; means for receiving authorization for one internet protocol version in a message, wherein the message identifies at least one internet protocol version that is authorized and further wherein the message identifies at least one internet protocol version that is not authorized; means for establishing a security authorization for the authorized internet protocol version, wherein the security authorization for the authorized internet protocol version is subordinate to a internet key exchange security authorization; means for establishing a secure tunnel for communication; and means for communicating using the secure tunnel.

A computer program product embodiment is provided, comprising: a computer-readable medium comprising: instructions for causing a computer to request authentication from an authorization entity in a wireless communication system; and instructions for causing a computer to receive an authentication message from the authorization entity if the authentication is successful, wherein the authentication message contains an authorization to use at least one internet protocol version to establish at least one secure tunnel for communication.

A further embodiment provides a computer program product comprising: a computer-readable medium comprising: instructions for causing a computer to request dual stack operation using more than one internet protocol version; instructions for causing a computer to receive authorization for dual stack operation using more than one internet protocol version; instructions for causing a computer to establish a separate subordinate security authorization for each internet protocol version, wherein the subordinate security authorization is subordinate to the internet key exchange security authorization; instructions for causing a computer to establish at least one secure tunnel for communication; and instructions for causing a computer to access simultaneously both internet protocol versions using the at lest one secure tunnel for communication.

An addition embodiment provides a computer program product comprising: a computer-readable medium comprising: instructions for causing a computer to request dual stack operation using more than one internet protocol version; instructions for causing a computer to receive authorization for one internet protocol version in a message, wherein the message identifies at least one internet protocol version that is authorized and further wherein the message identifies at least one internet protocol version that is not authorized; instructions for causing a computer to establish a security authorization for the authorized internet protocol version, wherein the security authorization for the authorized internet protocol version is subordinate to a internet key exchange security authorization; instructions for causing a computer to establish a secure tunnel for communication; and instructions for causing a computer to communicate using the secure tunnel.

DETAILED DESCRIPTION

The word "exemplary" is used herein to mean "serving as an example, instance, or illustration". Any embodiment described herein as "exemplary" is not necessarily to be construed as preferred or advantageous over other embodiments.

A MS desiring access to packet data services needs to gain access to the IP access network. The MS initiates tunnel establishment as part of the access process. These tunnels are established between the MS and the PDIF and require several steps before a tunnel is established and packet data services may be started.

The first step a MS takes begins an authentication, authorization, and accounting process. Authentication is the process of identifying and individual, most often, by a username and password. The authentication process assumes that a username and password uniquely identify a subscriber.

Authorization allows a user access to network resources after authentication. Varying levels of access may be possible and users may be granted or denied access to network resources depending on the level of authorization.

Accounting is the tracking of a user's activity while accessing network resources and includes the amount of time spent on the network, the services used while on the network, and the amount of data transferred during the network session.

Authentication and authorization to access network resources is performed when the MS attempts to access packet data services. Service authorization is usually independent of WLAN authentication and authorization. The H-AAA server performs authentication and authorization using an access protocol, such as the Remote Authentication Dial-In User Service (RADIUS), or DIAMETER. RADIUS is an authentication and accounting system used by many internet service providers.

IP Security (IPsec) provides confidentiality, data integrity, access control and data source authentication to IP datagrams. These services are provided by maintaining a shared state between the source and the sink of an IP datagram. This state defines the specific services provided to the datagram and which cryptographic algorithms will be used to provide the services, and the keys used as input to the cryptographic algorithms. A protocol, know as the Internet Key Exchange (IKE) is used to establish this shared state.

IKE performs mutual authentication between two parties and also establishes an IKE security association (SA) that includes shared secret information that can be used to efficiently establish SAs for Encapsulating Security Payload (ESP) and/or Authentication Header (AH) and a set of cryptographic algorithms to be used by the SAs to protect the traffic that they carry. An initiator proposes the set of cryptographic algorithms used to protect a SA. An IKE_SA is called an "IKE_SA". The SAs for ESP and/or AH that are set up through that IKESA are known as "CHILD_SAs".

All IKE communications consist of pairs of messages: a request and a response. The pair is known as an exchange. The first messages that establish the IKE_SA are the initial exchange "IKE_SA_INIT" and "IKE_AUTH". Subsequent exchanges that establish a child SA are known as "CREATE_CHILD_SA" or informational exchanges. In a common case, there first is a single IKE_SA_INIT exchange and a single IKEAUTH exchange using a total of four messages to establish the IKE_SA and the first CHILD_SA. In some cases more than one such exchange may be needed. In all cases, the IKE_SA_INIT exchanges must complete prior to any other exchange type. Next, all the IKEAUTH exchanges must be completed. Following any number of CREATE_CHILD_SA exchanges and INFORMATIONAL exchanges may follow in any order. Subsequent exchanges may establish additional CHILD_SAs between the same authenticated pair of endpoints.

IKE message flow consists of a request followed by a response. It is the responsibility of the requester to ensure reliability. If the response is not received within a timeout interval, the requester needs to retransmit the request or abandon the connection.

The first request/response of an IKE session negotiates the security parameters of the IKESA, sends nonces, and Diffie-Hellman values.

The second request response, IKE_AUTH transmits identities, proves knowledge of the secrets corresponding to the two identities, and sets up a SA for the first AH and/or ESP CHILD_SA.

Subsequent exchanges may create CHILD_SAs (CREATE_CHILD_SA) and INFORMATIONAL, which may delete a SA, report error conditions or other housekeeping functions. Every request requires a response. Subsequent exchanges may not occur until after completion of the initial exchanges.

The CREATE_CHILD exchange consists of a single request/response pair and may be initiated by either end of the IKE_SA after the initial exchanges are completed. All messages after the initial exchange are cryptographically protected using the negotiated cryptographic set of the first two messages of the IKE exchange. Either endpoint may initiate a CREATECHILD_SA exchange. A CHILD_SA is created by sending a CREATECHILD_SA request. The CREATECHILD_SA request may contain a payload for an additional Diffie-Hellman exchange to enable more robust guarantees for forward secrecy for the CHILD_SA. The keying material for the CHILD_SA is a function established during the establishment of the IKE_SA, the nonces exchanged during the CREATE_CHILD_SA exchange, and the Diffie-Hellman value (if the key exchange payloads are included in the CREATE_CHILD_SA exchange.

In the CHILD_SA that was created during the initial exchange, a second key exchange payload and nonce, must not be sent. The nonces from the initial exchange are used to compute the keys for the CHILD_SA.

Figure 2:
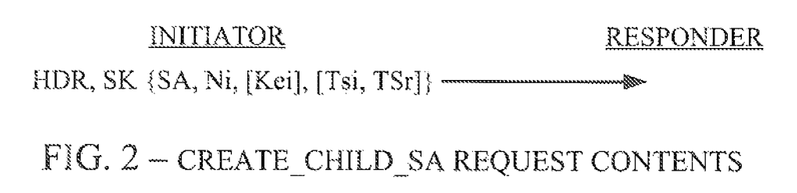
FIG. 2 shows the contents of the CREATE_CHILD_SA request according to an embodiment of the invention.

FIG. 2 illustrates the contents of the CREATE_CHILD_SA. The initiator sends a SA offer(s) in the SA payload. A nonce is sent in the Ni payload. This nonce, and others contained in the IKE_SA_INIT messages are used as inputs to cryptographic functions. In the CREATE_CHILD_SA request and response, the nonces are used to add freshness to the key derivation technique used to obtain keys for the CHILD_SA, and to ensure the creation of strong pseudo-random bits from the Diffie-Hellman key. Nonces used in IKEv2 are randomly chosen and are at least 128 bits in size and are at least half the key size of the negotiated pseudo-random function. A Diffie-Hellman value may be sent in the KEi payload. The proposed traffic selectors are sent in the TSi and TSr payloads. If the SA offers include different Diffie-Hellman groups KEi must be an element of the group that the initiator expects the responder to accept. If the guess is wrong the CREATE_CHILD_SA exchange will fail and will need to be retried with a different KEi.

The message following the header is encrypted and the message including the header is integrity protected using the negotiated cryptographic algorithms for the IKESA.

Figure 3:
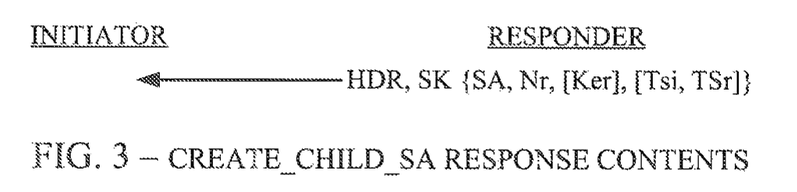
FIG. 3 shows the contents of the CREATE_CHILD_SA response according to an embodiment of the invention.

FIG. 3 shows the contents of the CREATE_CHILD_SA response. The responder replies using the same message identifier with the accepted offer in a SA payload and a Diffie-Hellman value in the KEr payload if KEi was included in the request and the negotiated cryptographic set includes that group. If the responder selects a cryptographic set with a different group, it must reject the request. The initiator should then repeat the request, but with a KEi payload from the group the responder selected. The traffic selectors for traffic to be sent on that SA are specified in the traffic selector (TS) payloads, which may be a subset of the initiator of the CHILD_SA proposed. Traffic selectors may be omitted if the CREATECHILD_SA request is being used to change the key of the IKESA.

Once the CHILD_SA has been created, the next step is to set up the IPsec tunnel. Tunnel establishment procedures are detailed below.

The MS may either be pre-provisioned with the IP address of the PDIF or shall use DNS mechanisms to retrieve the IP address of the PDIF. When building a FQDN for the DNS request the MS should identify the operator's network. To facilitate access to the network, the MS may be pre-provisioned with the FQDNs of multiple PDIFs. Once a MS receives a response containing one or more PDIF IP addresses, the MS selects a PDIF IP address with the same IP version as its local IP address that is the IP address allocated by the WLAN at successful association. This selection may be performed by the user or may be performed automatically by the MS. Several mechanisms may be used to discover the PDIF and are implementation dependent.

Figure 4A:
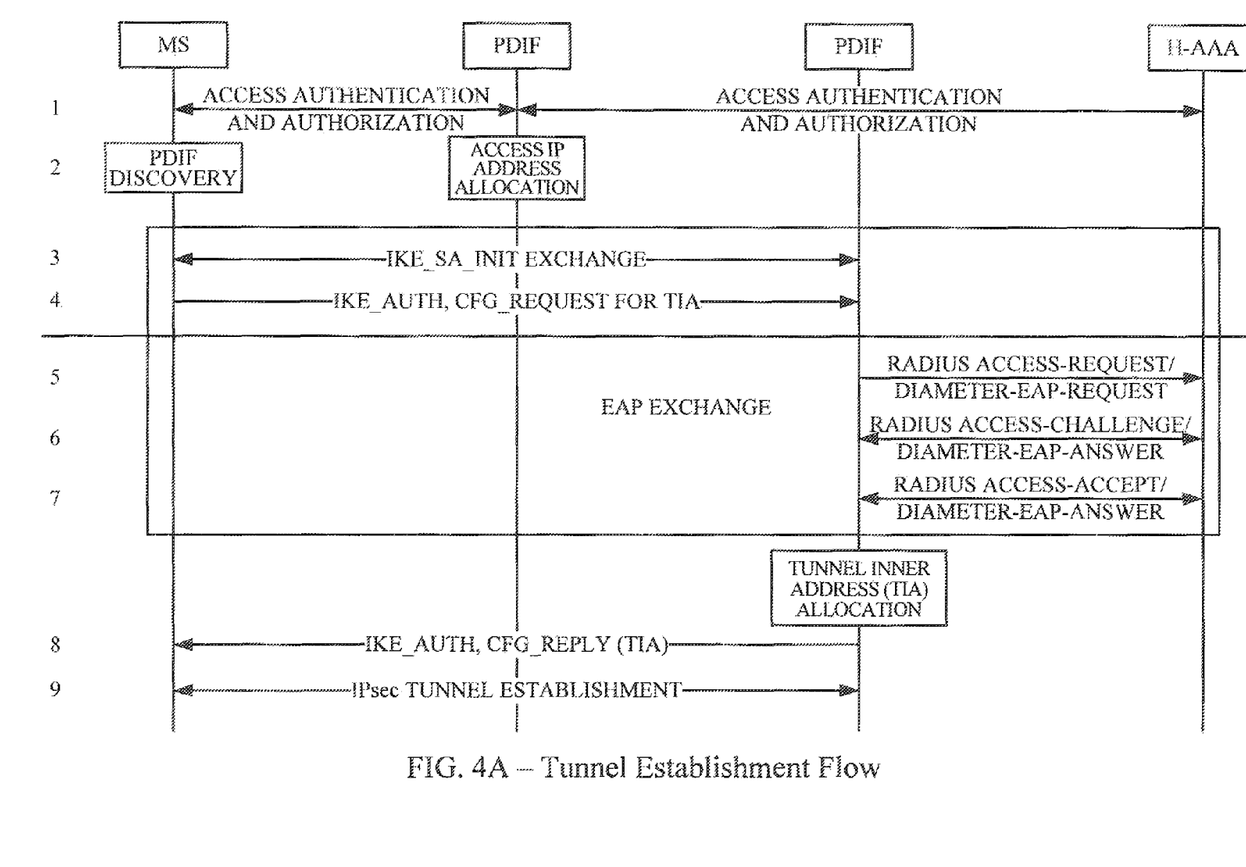
FIG. 4A shows IPsec Tunnel Establishment according to an embodiment of the invention.

A message exchange is used to set up the IPsec tunnel between the MS and the PDIF. FIG. 4 shows this message exchange. In step 1 the MS authenticates to the WLAN Access Network and gains access to the Internet. This may involve the WLAN checking with the H-AAA for authorization.

In step 2 the MS obtains an IP address from the Access Network. The MS also discovers the default router and the DNS server addresse(s).

In step 3 the MS begins an IKEv2 exchange with the PDIF. The first set of messages sent in this exchange is the initial exchange, designated IKE_SA_INIT.

In step 4 the MS initiates the IKE_AUTH exchange with the PDIF. These messages are encrypted and integrity protected with the keys established during the IKESA_INIT exchange.

The MS requests a tunnel inner IP address (TIA) in step 5, by setting the CONFIGURATION payload in the IKEAUTH request. The MS includes its Network Access Identifier (NAI) in the payload. If the MS wishes to use the Extensible Authentication Protocol (EAP) it does not include the authorization (AUTH) payload in the IKE_AUTH message.

In step 6 the PDIF receives the IKEAUTH request without the AUTH payload it contacts the H-AAA to request service authorization and user authentication information by sending the EAP-Response/Identity message in the RADIUS Access-Request message or Diameter-EAP-Request (DER) command.

In step 7 EAP messages are exchanged between the MS and H-AAA. The H-AAA sends an EAP request message in the RADIUS Access-Challenge or in a Diameter-EAP-Answer (DEA) command to the PDIF. The PDIF sends the IKEAUTH reply message including the EAP request message to the MS.

The MS responds in step 8 with the IKEAUTH request message including the EAP response message. The PDIF sends the EAP response message in the RADIUS Access-Request message or the Diameter-EAP-Request Command to the H-AAA. Steps 7 and 8 may occur a number of times.

If the authentication is successful, in step 9 the H-AAA sends the EAPSuccess in the RADIUS Access-Accept message or, a DEA command with a code indicating successful authentication.

In step 10, upon receipt of a RADIUS Access-Accept message or a DEA command with a result code that indicates successful authentication, the PDIF sends an IKEAUTH response message that includes the EAP success. If the PDIF receives a RADIUS-Reject message or a DEA command with a result code indicating failure of authorization, the PDIF rejects tunnel establishment toward the MS and sends an IKEAUTH response message with the Notify payload set to 'AUTHENTICATION FAILED'.

The MS then sends the IKEAUTH request message in step 11, including the AUTH payload calculated from the Master Session Key (MSK) which is generated upon successful EAP authentication.

The PDIF replies with the IKEAUTH response message in step 12, including an assigned TIA, AUTH payload, and security authorizations. The PDIF uses the MSK to compute the AUTH payload. The PDIF obtains the MSK from the H-AAA in step 9, above.

In step 13, when the IKEAUTH exchange is completed, an IPsec tunnel is established between the MS and the PDIF.

Figure 4B:
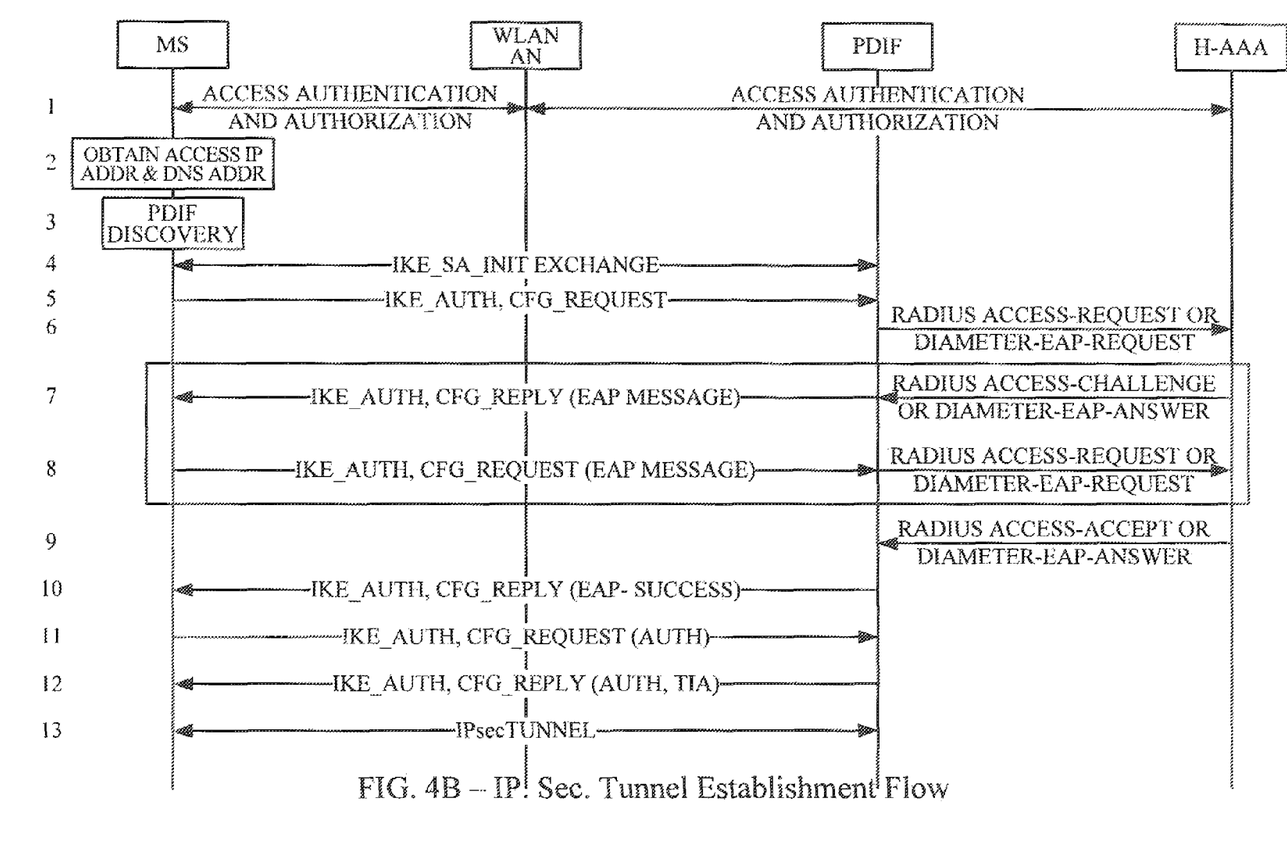
FIG. 4B shows Tunnel Establishment Flow according to an embodiment of the invention.

FIG. 4B illustrates the steps in normal tunnel establishment flow. This may be utilized when establishing multiple tunnels as discussed further below.

It is possible to establish multiple tunnels to the same PDIF. Once the IKE Security Association (SA) has been authenticated, more than one child SA can be negotiated within the IKE_SA. The exchange is known as the CREATE_CHILD_SA is protected and uses the cryptographic algorithms and keys negotiated in the first two messages of the IKE exchange, as described above. As a result, the creation of additional CHILD_SAs between the MS and the PDIF does not trigger further authentication messaging to the H-AAA.

The MS may want to simultaneously have IPv4 and IPv6 access to the same PDIF. Although the IKEv2 standard allows such simultaneous access in the same or separate IPsec tunnels, authorization is not addressed and the PDIF needs to know whether the MS requesting dual-stack authorization is authorized for IPv4 and IPv6.

Figure 5:
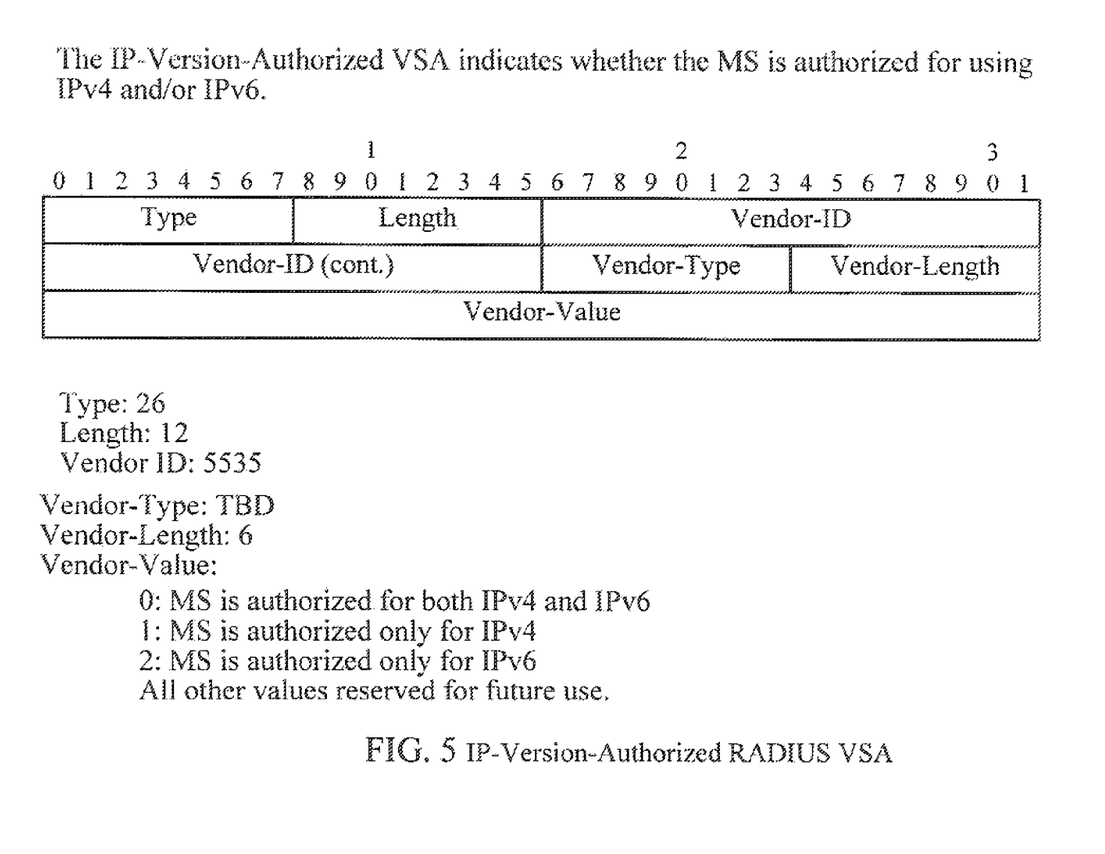
FIG. 5 shows the structure of the IP-Version-Authorized RADIUS VSA according to an embodiment of the invention.

The first embodiment addresses the question of the PDIF knowing if the requesting MS is authorized for IPv4 and/or IPv6. During the IPsec tunnel establishment as described above, if the EAP authorization is successful, the H-AAA returns the IP-Version-Authorized VSA in the RADIUS Access-Accept message to indicate whether IPv4 and/or IPv6 are authorized. If the IP-Version-Authorized VSA is not present in the RADIUS Access-Accept message the PDIF shall apply its local policy for the authorization of dual stack operation. FIG. 5 shows the structure of the IP-Version-Authorized RADIUS VSA.

Figure 6:
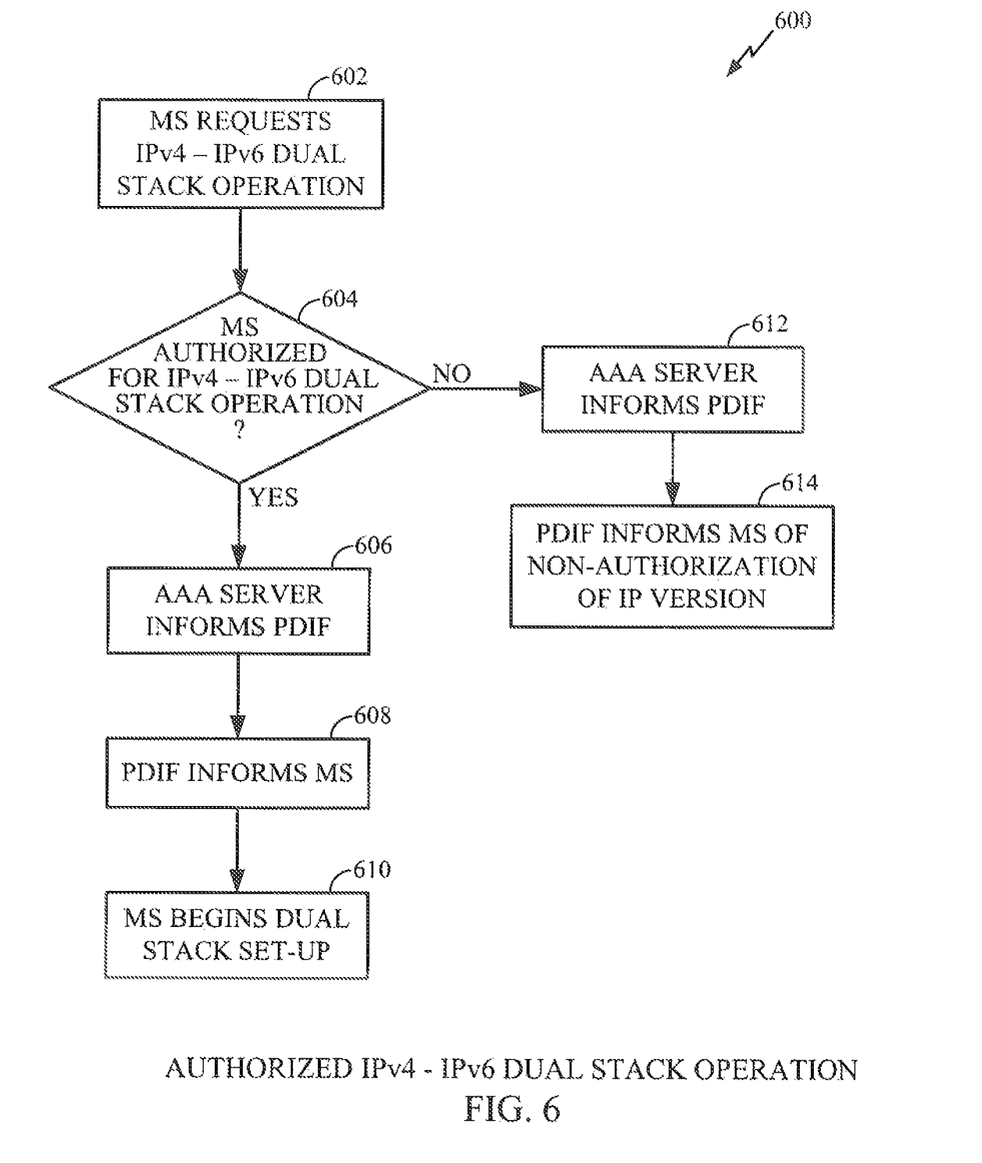
FIG. 6 illustrates a flow chart of authorized IPv4-IPv6 dual stack operation according to an embodiment of the invention.

Another embodiment is used when the MS wants to use IPv4 and IPv6 simultaneously and is authorized to use both. FIG. 6 illustrates the method of this embodiment. The method, 600 begins when the MS requests IPv4-IPv6 dual stack operation in step 602. This request is in the form of a message sent to the AAA server through the PDIF. In step 604, the AAA server determines if the MS is authorized to use both IPv4 and IPv6. In step 606 the AAA server informs the PDIF that the requesting MS is authorized to use both IPv4 and IPv6. The PDIF informs the MS in step 608 that the request for IPv4-IPv6 dual stack operation is authorized. In step 610, the MS and PDIF establish separate CHILD_SAs under the same IKE_SA for IPv4 and IPv6. If the MS is not authorized for both IPv4 and IPv6, the AAA server informs the PDIF in step 612. In turn, the PDIF informs the MS in step 614 of the non-authorization and also informs the MS which IP version is not authorized.

Figure 7:
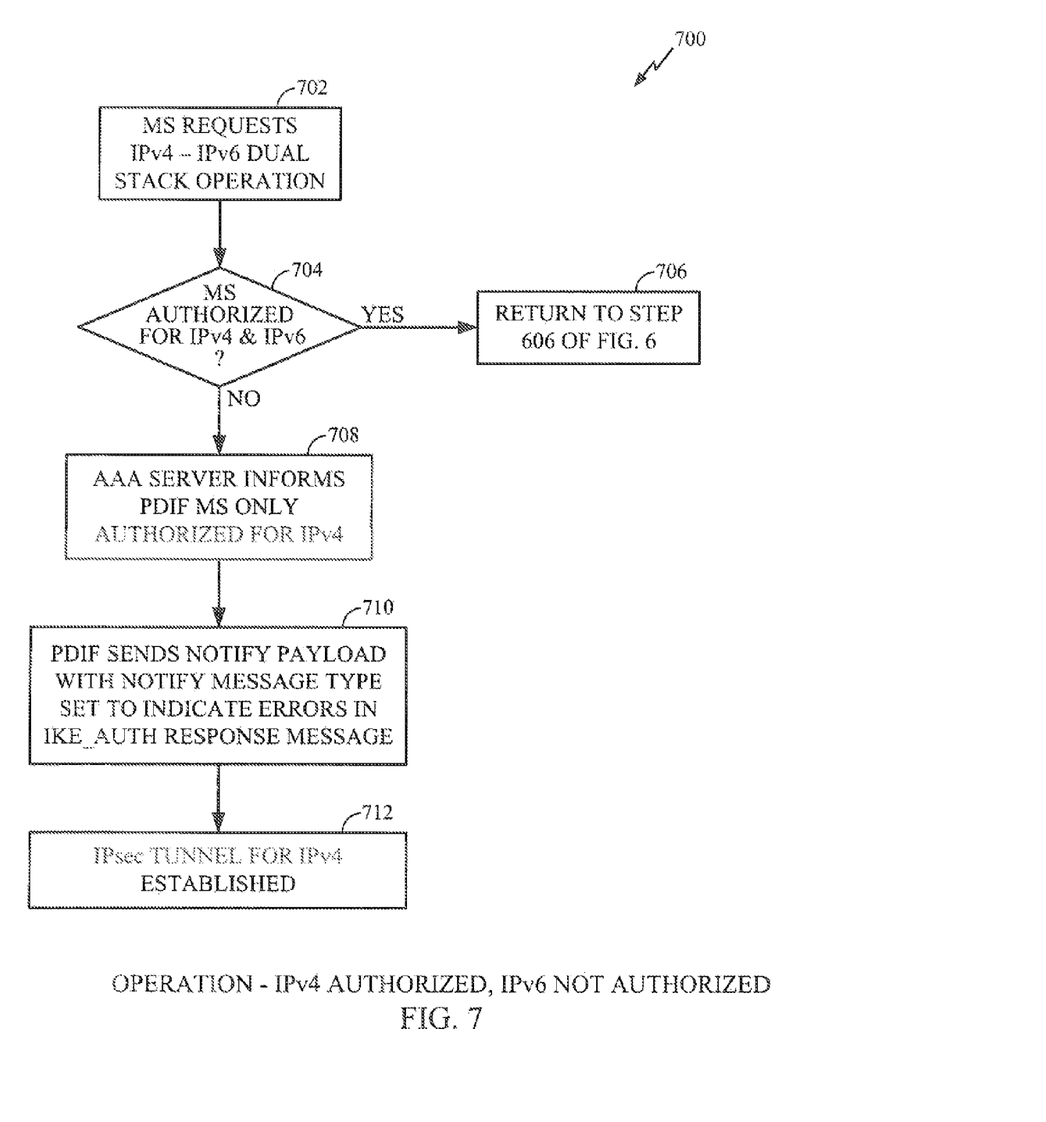
FIG. 7 illustrates a flow chart of operation when only IPv4 is authorized according to an embodiment of the invention.

Yet another embodiment is used when the MS may desire to use both IPv4 and IPv6 simultaneously, but may only be authorized for IPv4. FIG. 7 illustrates the method of operation of this embodiment. The method, 700 begins with step 702 when the MS requests IPv4-IPv6 dual stack operation. In step 704 the AAA server checks to see that the MS is authorized for both IPv4 and IPv6. If the MS is authorized for both IPv4 and IPv6, the method returns to step 606 of the method of FIG. 6. If the MS is authorized for only IPv4, the AAA server informs the PDIF that the MS is only authorized for IPv4. The PDIF sends a Notify Payload with the Notify Message Type set to a specific message type that indicates that only IPv4 is authorized in step 710. If the wireless communication system operates using the 3GPP2 standard, the Message Type is set to 8193 in the IKEAUTH Response message. Other operating systems may use different message types, but do not affect the operation of this embodiment. In this case, in step 712 only the IPsec tunnel for IPv4 will be established. To prevent the MS from establishing an IPv6 session with the network, the MS sets the INTERNAL_IP6_ADDRESS attribute t 0::0 in CFG request payload. The PDIF sets the length of the INTERNAL_IP6_ADDRESS attribute to zero in the CFG reply payload. The PDIF may notify the MS that the MS is not authorized for IPv6 access by sending a Notify Payload with a specific message type indicating errors. If the MS tries to acquire an IPv6 prefix from the PDIF, the PDIF discards the message without notifying the MS.

Figure 8:
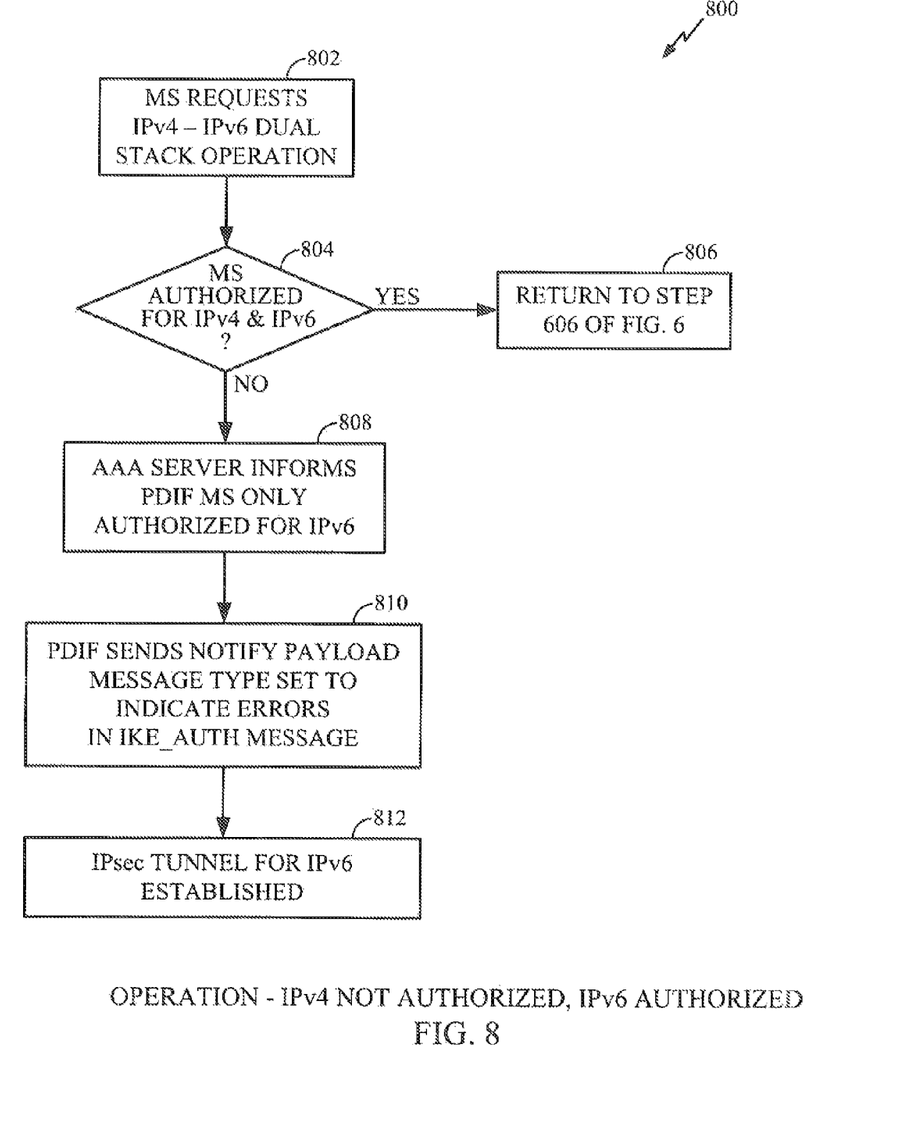
FIG. 8 illustrates a flow chart of operation when only IPv6 is authorized according to an embodiment of the invention.

FIG. 8 illustrates an embodiment used when the MS desires to utilize IPv4 and IPv6 dual stack operation but is only authorized for IPv6. The method, 800, begins with step 802 when the MS requests IPv4-IPv6 dual stack operation. The AAA server checks to see if the MS is authorized for IPv4 and IPv6 in step 804. If the MS is authorized for both IPv4 and IPv6, the method returns to step 606 of FIG. 6. If the MS is not authorized for IPv4 and IPv6 and is only authorized for IPv6 in step 808 the AAA server informs the PDIF that the MS is only authorized for IPv6. In step 810, the PDIF sends the Notify Payload Message with the Notify Message Type set to a specific message type that indicates that the MS is only authorized for IPv6 in the IKEAUTH Response message. If the wireless communication system operates using the 3GPP2 standard, the Message Type is set to 8194. In step 812 the IPsec tunnel for IPv6 is established. The MS is prevented from establishing an internal IPv4 session with the network by having the MS set the INTERNAL_IP4_ADDRESS attribute to 0.0.0.0 in the CFG request payload. Likewise, the PDIF sets the length of the INTERNAL_IP4_ADDRESS attribute to zero in the CFG reply payload. The PDIF may notify the MS that the MS is not authorized for IPv4 access by sending a Notify Payload with a specific message type. If the MS attempts to acquire an IPv4 prefix from the PDIF the PDIF discards the message without notifying the MS.

In further embodiments, those skilled in the art will appreciate that the foregoing methods can be implemented by the execution of a program embodied on a computer readable medium, such are the memory of a computer platform. The instructions can reside in various types of signal-bearing or data storage primary, secondary, or tertiary media. The media may comprise, for example, RAM accessible by, or residing within, the client device and/or server. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM or EEPROM), flash memory cars, an optical storage device (e.g., CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. The activities or steps of the method claims in accordance with the embodiments of the invention described herein need not be performed in any particular order. Furthermore, although elements of the invention may be described or claimed in the singular, the plural contemplated unless limitation to the singular is explicitly stated.

Preferred embodiments of the present invention have thus been shown and described. It would be apparent to one of ordinary skill in the art, however, that alterations may be made to the embodiments herein disclosed without from the spirit or scope of the invention. Therefore, the present invention is limited except in accordance with the following claims.

What is claimed is:

1. A method comprising:
    requesting, at a mobile station, authentication from a home authorization device in a wireless communication system; and
    receiving an authentication message from the home authorization device if the authentication is successful, wherein the authentication message contains an authorization to use 1) a first internet protocol version only and not a second internet protocol version, 2) the second internet protocol version only and not the first internet protocol version, or 3) both the first and second internet protocol versions to establish at least one wireless secure tunnel with the mobile station for communication.

2. The method of claim 1, wherein the authorization to use the two internet protocol versions is a IP-Version-Authorized VSA sent in a RADIUS Access-Accept message.

3. The method of claim 2, wherein if the IP-Version-Authorized VSA is not present in the RADIUS Access-Accept message, a packet data interworking function in the wireless communication network shall apply local policy for authorizing dual stack operation.

4. The method of claim 1, wherein the first internet protocol versions is internet protocol version 4 (IPv4) and the second internet protocol version is internet protocol version 6 (IPv6), and wherein, in response to an authorization to use both IPv4 and IPv6, both IPv4 and IPv6 access a same packet data interworking function (PDIF) of the home authorization device.

5. The method of claim 4, wherein both IPv4 and IPv6 simultaneously access separate wireless secure tunnels, and wherein the authorization is a dual-stack authorization for IPv4 and IPv6.

6. A mobile station comprising:
    a transmitter for requesting authentication from a home authorization device in a wireless communication system; and
    a receiver for receiving an authentication message from the home authorization device if the authentication is successful, wherein the authentication message contains an authorization to use 1) a first internet protocol version only and not a second internet protocol version, 2) the second internet protocol version only and not the first internet protocol version, or 3) both the first and second internet protocol versions to establish at least one wireless secure tunnel with the mobile station for communication.

7. The mobile station of claim 6, wherein the authorization to use the two internet protocol versions is a IP-Version-Authorized VSA sent in a RADIUS Access-Accept message.

8. The mobile station of claim 7, further comprising:
    a processor for storing local policy for authorizing dual stack operation, wherein if the IPVersion-Authorized VSA is not present in the RADIUS Access-Accept message, a packet data interworking function in the wireless communication network shall apply local policy for authorizing dual stack operation.

9. The mobile station of claim 6, wherein the first internet protocol versions is internet protocol version 4 (IPv4) and the second internet protocol version is internet protocol version 6 (IPv6), and wherein, in response to an authorization to use both IPv4 and IPv6, both IPv4 and IPv6 access a same packet data interworking function (PDIF) of the home authorization device.

10. The mobile station of claim 9, wherein both IPv4 and IPv6 simultaneously access separate wireless secure tunnels, and wherein the authorization is a dual-stack authorization for IPv4 and IPv6.

11. A mobile station comprising:
means for requesting, at the mobile station, authentication from a home authorization device in a wireless communication system; and
means for receiving an authentication message from the home authorization device if the authentication is successful, wherein the authentication message contains an authorization to use 1) a first internet protocol version only and not a second internet protocol version, 2) the second internet protocol version only and not the first internet protocol version, or 3) both the first and second internet protocol versions to establish at least one wireless secure tunnel with the mobile station for communication.

12. The mobile station of claim 11, wherein the authorization to use the two internet protocol versions is a IP-Version-Authorized VSA sent in a RADIUS Access-Accept message.

13. The mobile station of claim 12, wherein if the IP-Version-Authorized VSA is not present in the RADIUS Access-Accept message, a packet data interworking function in the wireless communication network shall apply local policy for authorizing dual stack operation.

14. The mobile station of claim 11, wherein the first internet protocol versions is internet protocol version 4 (IPv4) and the second internet protocol version is internet protocol version 6 (IPv6), and wherein, in response to an authorization to use both IPv4 and IPv6, both IPv4 and IPv6 access a same packet data interworking function (PDIF) of the home authorization device.

15. The mobile station of claim 14, wherein both IPv4 and IPv6 simultaneously access separate wireless secure tunnels, and wherein the authorization is a dual-stack authorization for IPv4 and IPv6.

16. A non-transitory computer program product comprising:
a non-transitory computer-readable medium comprising:
instructions for causing a computer to request, at a mobile station, authentication from a home authorization device in a wireless communication system; and
instructions for causing the computer to receive an authentication message from the home authorization device if the authentication is successful, wherein the authentication message contains an authorization to use 1) a first internet protocol version only and not a second internet protocol version, 2) the second internet protocol version only and not the first internet protocol version, or 3) both the first and second internet protocol versions to establish at least one wireless secure tunnel with the mobile station for communication.

17. The computer program product of claim 16, wherein the first internet protocol versions is internet protocol version 4 (IPv4) and the second internet protocol version is internet protocol version 6 (IPv6), and wherein, in response to an authorization to use both IPv4 and IPv6, both IPv4 and IPv6 access a same packet data interworking function (PDIF) of the home authorization device.

18. The computer program product of claim 17, wherein both IPv4 and IPv6 simultaneously access separate wireless secure tunnels, and wherein the authorization is a dual-stack authorization for IPv4 and IPv6.

* * * * *